US006203591B1

(12) United States Patent
Clements et al.

(10) Patent No.: US 6,203,591 B1
(45) Date of Patent: Mar. 20, 2001

(54) BAGHOUSE, LONG FILTER ASSEMBLY AND METHOD OF INSTALLATION

(75) Inventors: Jack Thomas Clements, Lee's Summit, MO (US); Ronald LaWayne Mahoney, Mission; James Roy Doehla, Shawnee Mission, both of KS (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 09/163,654

(22) Filed: Sep. 30, 1998

(51) Int. Cl.$^7$ .............................. B01D 29/21; B01D 29/52
(52) U.S. Cl. .............................. 55/341.1; 55/482; 55/484; 55/492; 55/498; 55/502; 55/505; 55/508
(58) Field of Search .............................. 55/492, 498, 502, 55/505, 507, 508, 510, 484, 482, 341.1, 376; 95/286, 287

(56) References Cited

U.S. PATENT DOCUMENTS

| | | | |
|---|---|---|---|
| 3,716,971 | * | 2/1973 | Reinauer .............................. 55/341.1 |
| 3,877,899 | | 4/1975 | Bundy et al. . |
| 4,105,562 | * | 8/1978 | Kaplan et al. ....................... 55/341.1 |
| 4,228,012 | | 10/1980 | Pall . |
| 4,422,790 | | 12/1983 | Gebert et al. . |
| 4,443,237 | | 4/1984 | Ulvestad . |
| 4,445,914 | * | 5/1984 | Richard ................................. 55/484 |
| 4,445,915 | | 5/1984 | Robinson . |
| 4,559,138 | | 12/1985 | Harms, II . |
| 4,609,465 | | 9/1986 | Miller . |
| 4,624,785 | | 11/1986 | Drori . |
| 4,728,423 | | 3/1988 | Kuwajima . |
| 5,141,637 | | 8/1992 | Reed et al. . |
| 5,290,330 | * | 3/1994 | Tepper et al. .......................... 55/484 |
| 5,435,915 | | 7/1995 | Connors, Jr. . |
| 5,607,585 | | 3/1997 | Hobrecht et al. . |
| 5,746,792 | | 5/1998 | Clements et al. . |

OTHER PUBLICATIONS

J. Air Waste Manag. Assoc., Sep. 1992, pp. 1240–1249 The Potential of Pulse–Jet Baghouses for Utility Boilers. Part 2:Performance of Pulse–Jet Fabric Filter Pilot Plants.
J. Air Waste Manag. Assoc., Feb. 1992, pp. 209–217 The Potential of Pulse–Jet Baghouses for Utility Boilers. Part 1:A Worldwide Survey of Users.

\* cited by examiner

Primary Examiner—David A. Simmons
Assistant Examiner—Robert A. Hopkins
(74) Attorney, Agent, or Firm—Greg Strugalski

(57) ABSTRACT

A filter assembly (24) includes a first filter portion (80) with a first attachment (100) adapted to attach to a tubesheet (44) to support at least a portion of the first filter portion in a second plenum (40) and to permit fluid communication between the first filter portion and a first plenum (42). A tubular member (104) is fixed to and extends from the first attachment (100). A pleated filter element (120) is disposed adjacent to the tubular member (104) for support. A second attachment (140) is fixed to the tubular member (104) at a second end of the first filter portion (80) and defines an opening through which fluid may flow. The tubular member (104) is fixed to the first and second attachments (100, 140) with sufficient strength to support the weight of at least one other filter portion. A second filter portion (82) includes a third attachment (180) at a first end and defines an opening through which fluid may flow. A tubular member (186) is fixed to and extends from the third attachment (180). A pleated filter element (188) is disposed adjacent to the tubular member (186) for support. A plate (190) closes a second end of the second filter portion (82). A clamping mechanism (200, 240) sealingly connects the second attachment (140) of the first filter portion (80) with the third attachment (180) of the second filter portion (82) and permits fluid communication between the first and second filter portions. The clamping mechanism (200, 240) has sufficient strength to support eh weight of filter portions located on the side of the clamping mechanism opposite the first attachment (100) of the first filter portion (80).

24 Claims, 5 Drawing Sheets

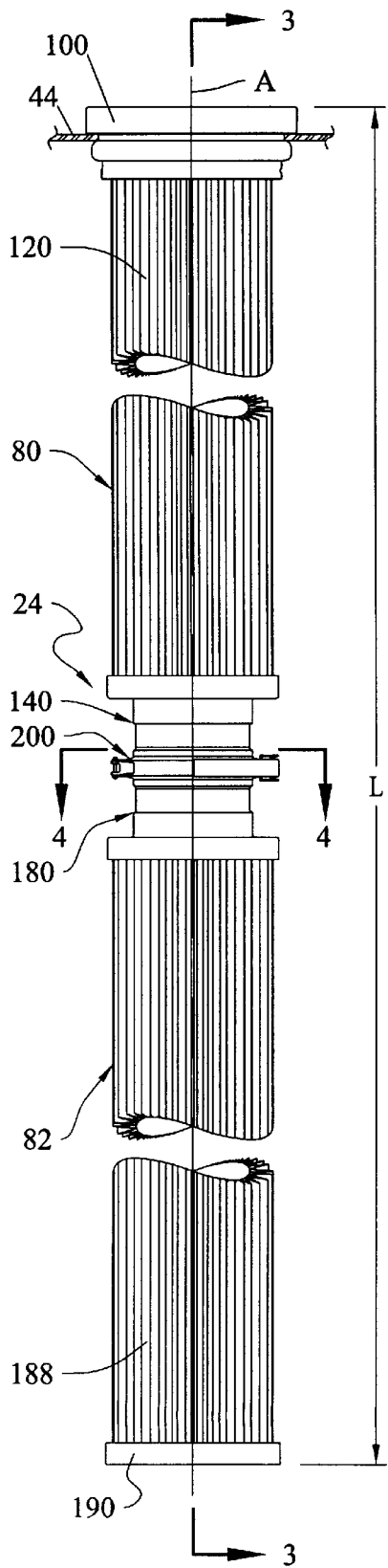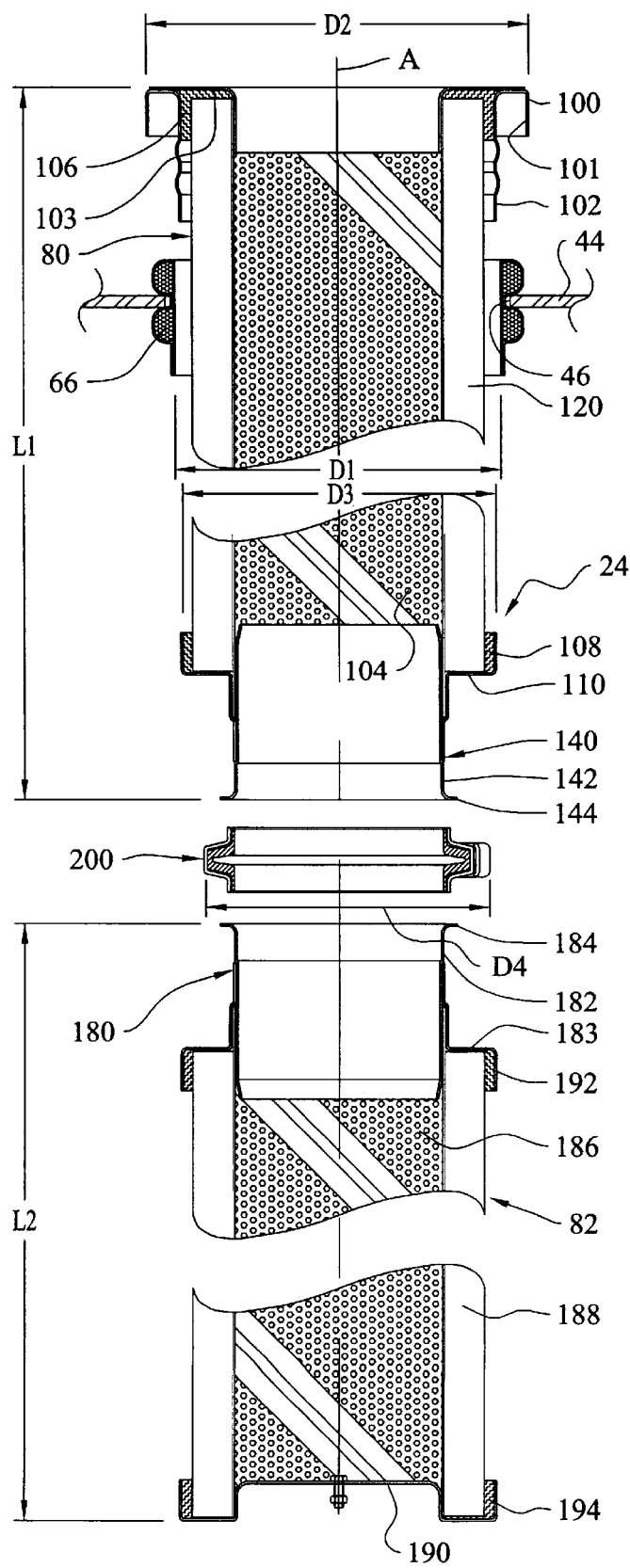
FIG. 2
FIG. 3

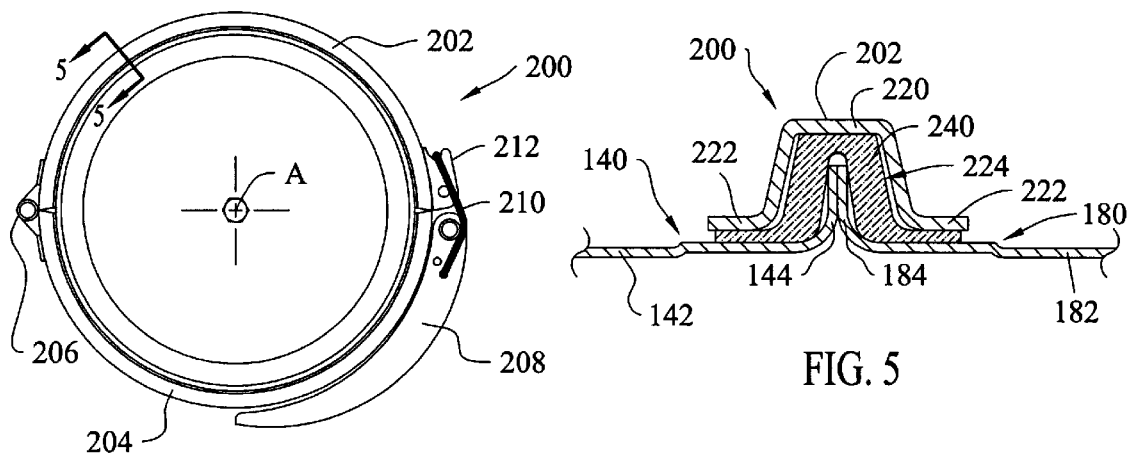
FIG. 4
FIG. 5
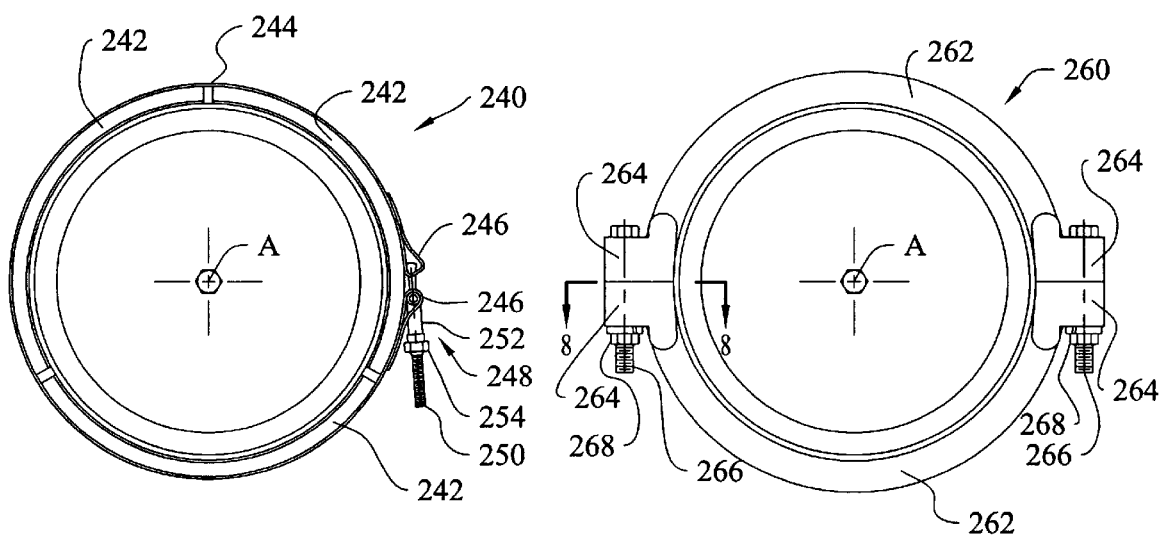
FIG. 6
FIG. 7
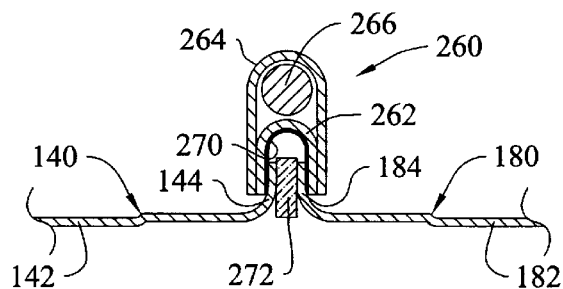
FIG. 8

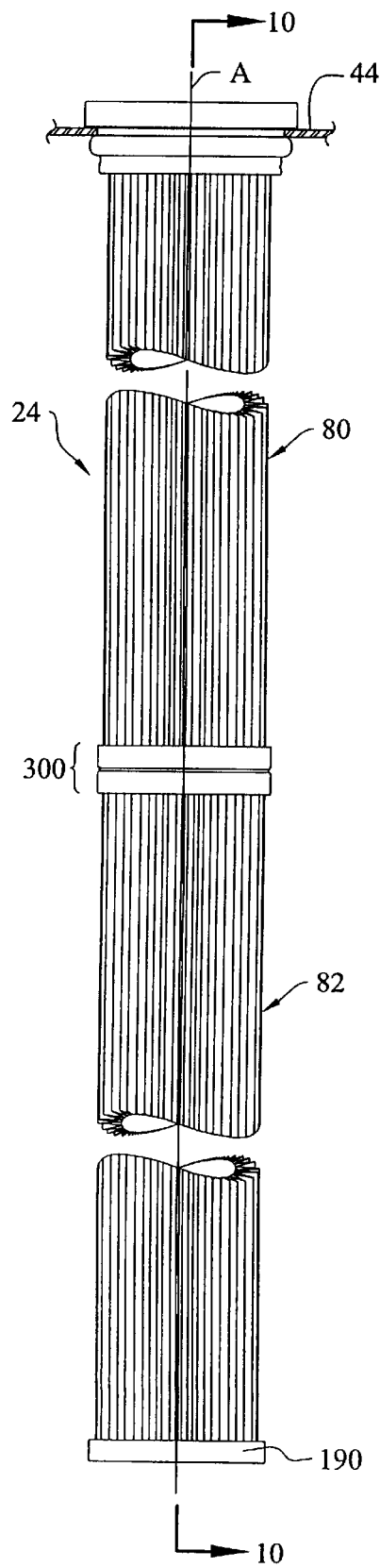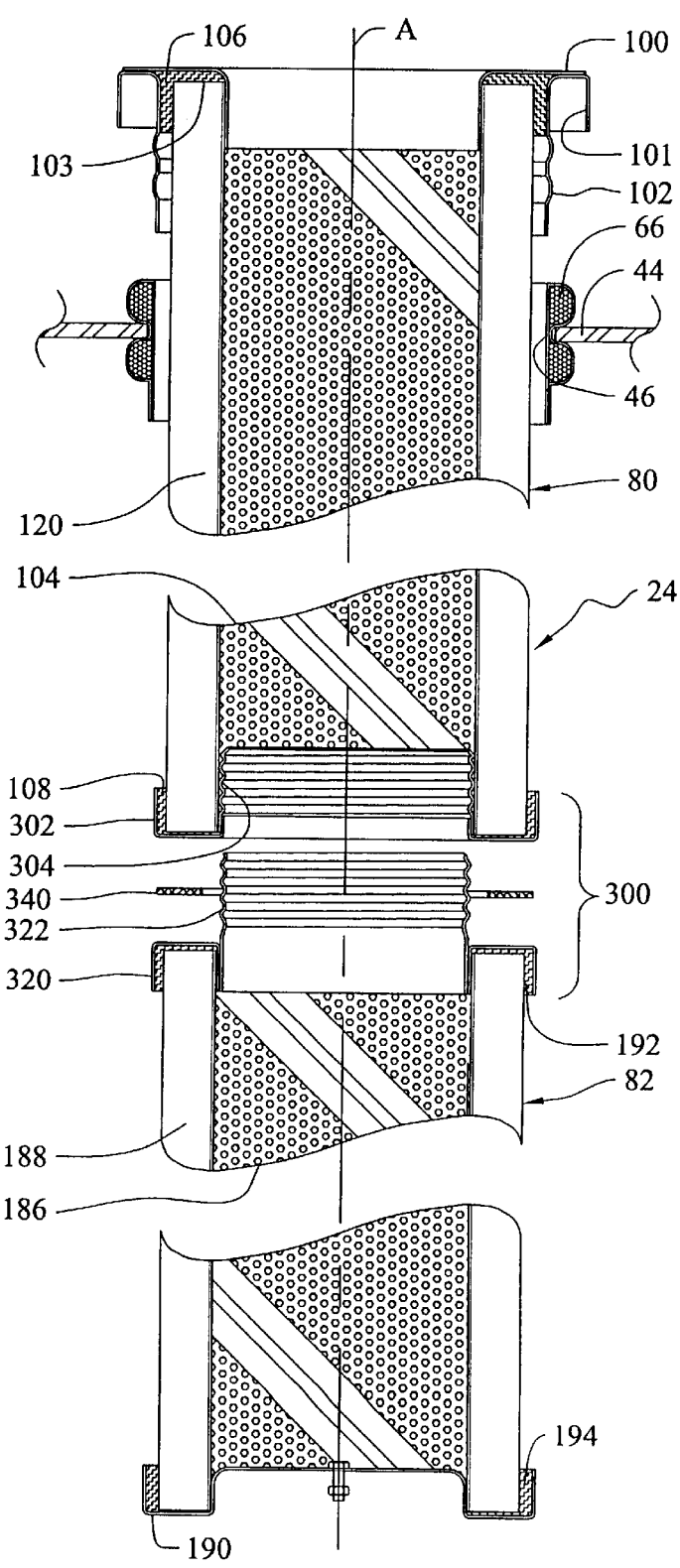
FIG. 9
FIG. 10

BAGHOUSE, LONG FILTER ASSEMBLY AND METHOD OF INSTALLATION

BACKGROUND OF THE INVENTION

1. Technical Field

The present invention relates generally to a baghouse, a filter assembly for use in the baghouse and a method of installing the filter assembly in the baghouse. In particular, the present invention relates to a relatively long multi-piece filter assembly having pleated filter elements.

2. Description of the Prior Art

Continuous emphasis on environmental quality results in ever-increasing regulatory control on pollutants and emissions throughout the world. Much of the regulatory control is focused on reducing pollutants and emissions from certain industrial plants, such as power plants and metal production plants. A known technique to control pollutants and emissions from industrial plants is to separate undesirable particulate matter carried in a gas stream by fabric filtration. Such fabric filtration is accomplished in a dust collection apparatus known in the industry as a "baghouse."

The baghouse typically includes a housing divided into two plenums by a tubesheet. One plenum is a "dirty air plenum" which communicates with an inlet and receives "dirty" or particulate laden gas from a source at the plant. The other plenum is a "clean air plenum" which receives cleaned gas after filtration and communicates with an outlet to direct cleaned gas away from the baghouse. A plurality of relatively long cylindrical fabric filters, commonly called "bags," are suspended from the tubesheet in the dirty air plenum. Each bag is installed over a cage and has a closed lower end. The cage may be in two or more pieces. Each bag is mounted to the tubesheet at its upper end to hang vertically in the dirty air plenum. The upper end portion of the bag is open and the interior of each bag is in fluid communication with the clean air plenum.

In operation, particulate laden gas is conducted into the dirty air plenum. As the particulate laden gas flows through the baghouse, the particulates carried by the gas engage the exterior of the fabric filter bags and accumulate on the fabric filter bags or are separated from the gas stream and fall into an accumulator chamber at the lower portion of the dirty air plenum. Cleaned gas then flows through the fabric filter bags, into the interior of the fabric filter bags, into the clean air plenum and through the outlet. Although many baghouses are made according to this basic structure, there may be numerous operational and structural differences among baghouses.

There is interest in replacing known fabric filter bags with pleated element filters to increase the effective filtering area while occupying the same space, or less, within the baghouse as the known fabric filter bags. However, certain barriers to easy replacement of fabric filter bags by pleated element filters exist. In some baghouse designs, the fabric filter bags can have a length of about four meters. The clean air plenum often has a clearance height that is substantially less than four meters, for example, about one and a half meters. It is generally not a problem to install fabric filter bags in the baghouse since the fabric filter bags are foldable, flexible and non-rigid. A relatively long and rigid pleated element filter cannot be installed without considerable manipulations if it can be installed at all, even if the baghouse has a roof with a portion that can be moved to a position which provides access to the clean air plenum. Not all baghouses have such a movable roof.

In order to occupy the same space within the baghouse as a fabric filter bag, the length of the pleated element filter would be relatively long and can be up to about four meters in length or more. This presents a problem for filter manufacturers because there are limits as to the width of the filter media that can be pleated with current production machinery to provide such a long filter. The current production machinery used to pleat filter media typically cannot accommodate continuous filter media more than about two meters in width. Such a long filter would also be relatively difficult to handle and transport.

If the more efficient pleated element filter is desired, the majority of the filter must be capable of being inserted through an opening in the tubesheet from the clean air plenum. If known, relatively short, pleated element filter structures are used and are axially connected together, more problems can arise. Any structure used to connect known pleated element filter structures together must be strong enough to carry the load of the filter when it has particulates accumulated on it and fit through an opening in the tubesheet. Furthermore, a potting material, such as silicone or polyurethane, is typically used to hold a pleated element in a known filter structure and connect other structure of the filter together. This potting material has limited ability to carry load. The weight of filters supported by the potting material is relatively large and can exceed the potting material's ability to carry sufficient load. For example, if a "clean" filter having a pleated element and a length of about four meters weighs twenty pounds, it is estimated that particulates which accumulate on the pleated element could add 200 to 300 pounds to the weight of the filter structure.

It is, thus, seen that using pleated element filters in baghouses is very desirable. Accordingly, there is a need in the industry for improvements in filter structure and installation techniques.

SUMMARY OF THE INVENTION

The present invention is directed to an industrial baghouse, a relatively long filter assembly for use in the baghouse and a method of installing the filter assembly in the baghouse. The filter assembly of the present invention provides a relatively large filtration area for the space occupied. The filter assembly of the present invention can replace fabric filter bags in existing baghouses or be specified in new baghouses to take advantage of the filter assembly's relatively large filtration area and ease of handling.

The baghouse of the present invention includes a housing that is divided into first and second plenums by a tubesheet. The tubesheet has a substantially planar portion with a plurality of openings extending through the planar portion. The first plenum has a first dimension taken in a direction normal to the planar portion of the tubesheet. The second plenum has a second dimension taken in a direction normal to the planar portion of the tubesheet. The second dimension is greater than the first dimension.

The baghouse includes a plurality of filter assemblies supported by the tubesheet at their upper ends. Each filter assembly is adapted to hang in a substantially vertical direction. Each filter assembly has a first filter portion with a first attachment at a first open end. The first attachment is adapted to mount the first filter portion to the tubesheet at a location adjacent to an opening in the tubesheet. The first attachment supports at least a portion of the first filter portion in the second plenum and permits fluid communication between the interior of the first filter portion and the first plenum. A tubular member is fixed to and extends from the first attachment. A pleated filter element is disposed adjacent to the tubular member for support. A second attachment is fixed to the tubular member at a second end of the first filter portion. The second attachment defines an opening at the second end of the first filter portion through which fluid may flow. The tubular member is fixed to the first and second attachments with sufficient strength to support the weight of at least one other filter portion.

A second filter portion includes a third attachment at a first end to define an opening through which fluid may flow. A tubular member is fixed to and extends from the third attachment. A pleated filter element is disposed adjacent to the tubular member for support. A plate is located at a second end of the second filter portion and defines a closed end of the second filter portion.

A connection device sealingly connects the second attachment of the first filter portion to the third attachment of the second filter portion to enable fluid communication between the first and second filter portions. The connection device has a strength sufficient to support the weight of filter portions located on a side of the connection device opposite the first attachment of the first filter portion.

The filter assembly has a length greater than the first dimension of the first plenum. At least one of the first and second filter portions has a length in the range of one meter to three meters. The first filter portion also includes a portion adapted to extend through a respective opening in the tubesheet when the filter assembly is mounted to the tubesheet. The tubular member in at least one filter portion is welded, riveted or fastened to at least one of the attachments.

The connection device has a size capable of fitting through the opening in the tubesheet. The connection device comprises a clamping mechanism. The clamping mechanism includes portions movable between an unclamped position and a clamped position in a plane extending substantially normal to a longitudinal central axis of the filter assembly. A gasket is locatable between a surface of the clamping mechanism and at least one of the second attachment of the first filter portion and the third attachment of the second filter portion. The connection device may comprise a threaded connection. A compressible gasket is locatable between the second attachment of the first filter portion and the third attachment of the second filter portion to compress as the filter portions are connected together.

The filter assembly may include a third filter portion with attachments at opposite open ends fixed to a tubular member supporting a pleated filter element. The tubular member is fixed to the attachments with a strength sufficient to support the weight of at least one other filter portion. The third filter portion is adapted to be located between and connected to the first and second filter portions by a pair of connection devices. Each connection device sealingly connects an attachment of one filter portion with an attachment of an axially adjacent filter portion to enable fluid communication between the connected filter portions. Each connection device has a size capable of fitting through the opening in the tubesheet and a strength to support the weight of at least one other filter portion located on a side of the connection device opposite the first attachment of the first filter portion.

The method of the present invention is directed to installing are relatively long filter assembly in a baghouse. The baghouse is divided into first and second plenums by a substantially planar tubesheet. A plurality of openings extend through the tubesheet. The first plenum has a first dimension taken normal to the tubesheet. The second plenum has a second dimension taken normal to the tubesheet. The second dimension is greater than the first dimension. At least one filter assembly is adapted to be supported mostly in the second plenum and hands in a substantially vertical direction.

the method includes the steps of providing a first filter portion with a first attachment at a first end. A tubular member is fixed to and extends from the first attachment. A pleated filter element is disposed about the tubular member for support. A second attachment is fixed to and extends from the tubular member at a second open end of the first filter portion through which fluid may flow.

The method also includes the step of providing a second filter portion with a third attachment at a first open end of the second filter portion through which fluid may flow. A tubular member extends from the third attachment. A pleated filter element is disposed about the tubular member for support. A plate is located at a second end of the second filter portion to define a closed end of the filter assembly.

The method further includes connecting the second attachment of the first filter portion to the third attachment of the second filter portion with a connection device. The connection device is constructed to have sufficient strength to support the operational weight of filter portions located on a side of the connection device opposite the first attachment of the first filter portion. The filter assembly and connection device may then be moved through the opening in the tubesheet.

The connecting together step further includes the step of providing a filter assembly having a length greater than the first dimension of the first plenum when the first and second filter portions are connected together. The method also includes the step of mounting the first attachment of the first filter portion to the tubesheet of the baghouse to support the filter assembly. The connecting together step includes moving portions of a clamp in a plane extending normal to the longitudinal central axis of the filter assembly to a clamped position against the second and third attachments. The connecting together step may include treading the third attachment into the second attachment.

BRIEF DESCRIPTION OF THE DRAWINGS

Further features of the present invention will become apparent to those skilled in the art to which the present invention relates from reading the following description with reference to the accompanying drawings, in which:

FIG. 2 is an elevational view of a filter assembly, illustrated in FIG. 1, according to one embodiment of the present invention;

FIG. 3 is an exploded sectional view of the filter assembly illustrated in FIG. 2, taken approximately along the line 3—3 in FIG. 2;

FIG. 4 is a plan view of a connection device of the filter assembly illustrated in FIG. 2, taken approximately along the line 4—4 in FIG. 2;

FIG. 5 is a sectional view of the connection device and a portion of the filter assembly illustrated in FIG. 4, taken approximately along the line 5—5 in FIG. 4;

FIG. 6 is a view similar to FIG. 4 of an alternate connection device;

FIG. 7 is a view similar to FIG. 4 of an another alternate connection device;

FIG. 8 is a sectional view of the connection device and a portion of the filter assembly illustrated in FIG. 7, taken approximately along the lines 8—8 in FIG. 7;

FIG. 9 is a view similar to FIG. 2 of a filter assembly according to an alternate embodiment of the present invention;

FIG. 10 is an exploded sectional view of the filter assembly illustrated in FIG. 9, taken approximately along the line 10—10 in FIG. 9.

DESCRIPTION OF PREFERRED EMBODIMENTS

Figure 1:
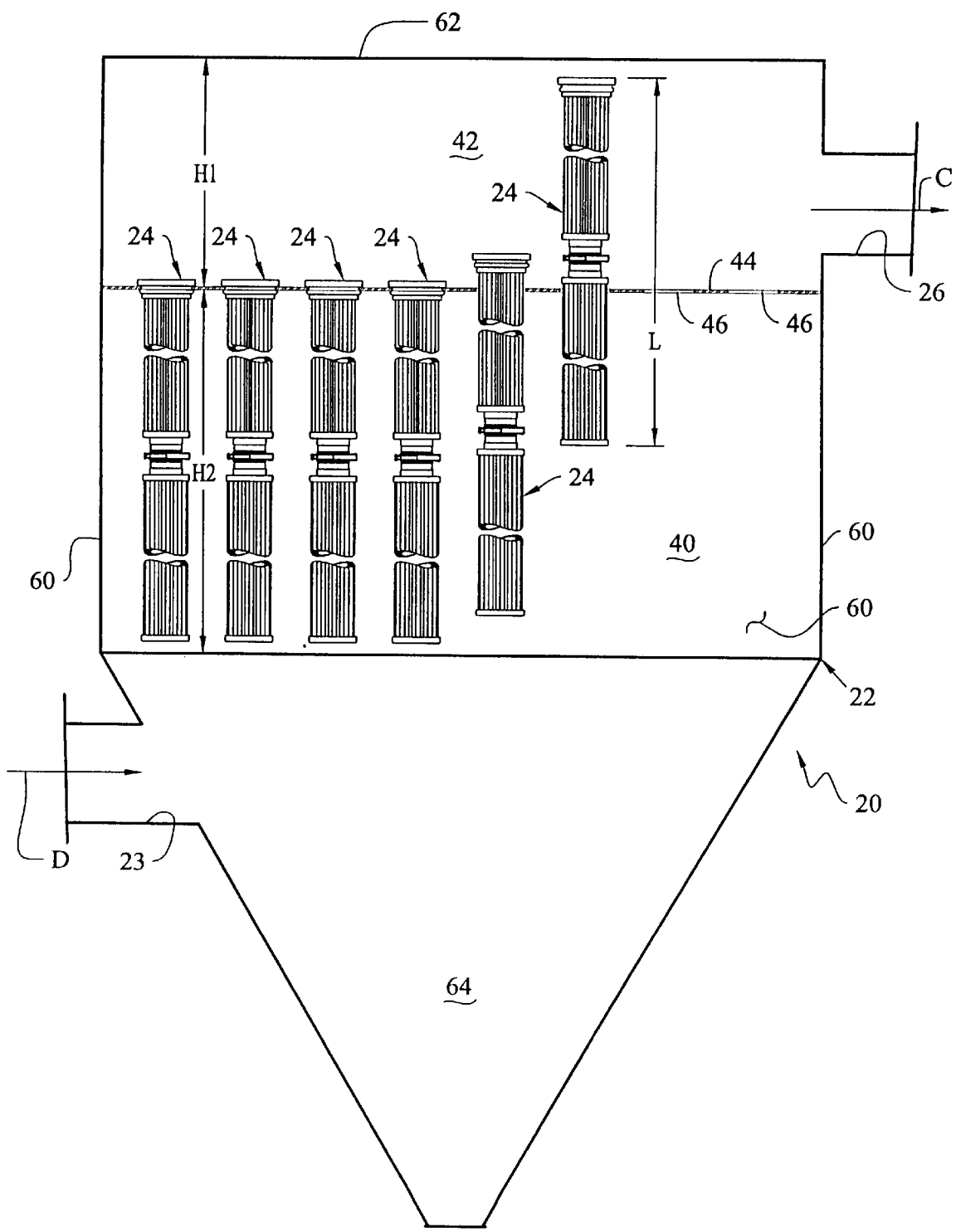
FIG. 1 is a schematic view, partly in section, of a baghouse of the present invention with filter assemblies of the present invention installed.

A baghouse 20 according to the present invention is illustrated in FIG. 1. The baghouse 20 is defined by an enclosed housing 22. The housing 22 is made from a suitable material, such as sheet metal. A particulate laden gas D flows through the baghouse 20 from an inlet 23. The particulate laden gas D is filtered by a plurality of filter assemblies 24 (FIG. 2) of the present invention located within the baghouse 20. Cleaned gas C exits through an outlet 26 of the baghouse 20.

The baghouse 20 is divided into a "dirty air" plenum 40 and a "clean air" plenum 42 by a tubesheet 44 made from a suitable material, such as sheet metal. The tubesheet 44 has at least a portion that is substantially planar. The inlet 23 is in fluid communication with the dirty air plenum 40. The outlet 26 is in fluid communication with the clean air plenum 42.

A plurality of openings 46 extend through the planar portion of the tubesheet 44. Each opening 46 has an effective diameter D1 (best seen in FIG. 3), defined by the inner surface of the opening or any intervening component, through which a portion of the filter assembly 24 can be moved. The clean air plenum 42 has a minimum dimension or clearance height H1 taken in a direction normal to the tubesheet 44. The dirty air plenum 40 has an access height H2 taken in a direction normal to the tubesheet 44 in which a filter assembly 24 can be installed without engaging the housing 22 of the baghouse 20. The height H3 of the dirty air plenum 40 is greater than the height H1 of the clean air plenum 42. The height H2 of the dirty air plenum 40 is approximately one and a half to four times the height H1 of the clean air plenum 42.

the housing 22 of the baghouse 20 includes sides 60 and a roof 62. The baghouse 20 is illustrated as having a non-movable roof 62. Thus, access to the clean air plenum 42 and baghouse 20 is limited. It will be apparent to one skilled in the art that the roof 62 can have access panels that are removable or movable to a position that does not inhibit access to the clean air plenum 42. The baghouse 20 also has an accumulation chamber 64 defined by irregular shaped and sloped walls located at a lower end of the dirty air plenum 40. The filter assemblies 24 are illustrated as not extending into the accumulation chamber 64 but it will be apparent that the filter assemblies may extend into the accumulation chamber.

A resilient mounting band 66 is located in the opening 46 in the tubesheet 44. The band 66 is made from metal, such as a stainless steel, and is covered with fabric. The band 66 is constructed with an outer diameter substantially equal to the inner diameter of the opening 46. The band 66 may be easily deformed and inserted into the opening 46. The exterior surface of the band 66 snugly engages the surface defining the opening 46. The band 66 provides a seal between the filter assembly 24 and the opening 46 in the tubesheet 44. The band 66 is described in detail in U.S. Pat. No. 5,746,792, which is assigned to the assignee of the present invention and incorporated herein by reference.

The filter assemblies 24 filter particulates from the particulate laden gas D as the gas passes radially inward through each filter assembly. Each filter assembly 24 is made up of at least an upper filter portion 80 (as viewed in FIGS. 2–3) and a lower filter portion 82. The filter portions 80, 82 are axially aligned in an end-to-end stack and connected together in a fluid-tight relationship. Each filter assembly 24 is supported at its upper end (as viewed in FIGS. 1–3) by the tubesheet 44 and hangs downwardly in a substantially vertical direction. A tubular mounting sleeve 100 is located at the upper end (as viewed in FIGS. 2 and 3) of the filter assembly 24 and bears the entire weight of the filter assembly when the mounting sleeve is attached to the tubesheet 44. The mounting sleeve 100 has an outer diameter D2 (FIG. 3) that is greater than the effective inner diameter D1 of the band 66 and opening 46.

Each filter assembly 24 has a longitudinal central axis A. Each filter assembly 24 has an overall length L taken in a direction parallel to the axis A. The length L of the filter assembly 24 is greater than the clearance height H1 of the clean air plenum 40 and preferably less than the access height H2 of the dirty air plenum 42 at least in the location closest to the inner periphery of the housing 22. The upper filter portion 70 has a length L1 (FIG. 3) taken in a direction parallel to the axis A of the filter assembly 24. The lower filter portion 82 has a length L3 taken in a direction parallel to the axis A of the filter assembly 24. It will be apparent that any number and lengths of filter portions could be utilized that are suitable to the filtering requirements of the baghouse 20.

The length L of the filter assembly 24 can be any desired length that is appropriate for particular filtering requirements. At least one of the upper and lower filter portions 80, 82 of the filter assembly 24 has a length in the range of one meter to three meters. Preferably, the length L1 or L2 of the filter portion 70 or 82 is less than the clearance height H1 of the clean air plenum 42. It will also be apparent that the length L1 of the upper filter portion 80 can be different from the length L2 of the lower filter portion 82.

The upper filter portion 80 is open on both ends, as illustrated in FIG. 3. The mounting sleeve 100 is located at an upper end (as viewed in FIGS. 2 and 3) of the upper filter portion 80 to attach the upper filter portion and filter assembly 24 to the tubesheet 44. The mounting sleeve 100 is made from a suitable material, such as stamped, drawn or otherwise formed metal. The mounting sleeve 100 defines an open end of the upper filter portion 80 for fluid communication with the clean air plenum 42. While the upper filter portion 80 is described as having a circular cross-section, it will be apparent that any suitable configuration cross-section could be used, such as oval or square.

One of the filter assemblies 24 (FIGS. 1–3) extends through a respective opening 46 in the tubesheet 44 and through the band 66. The band 66 ensures that the filter assembly 24 may be used with openings 46 that have not been precisely cut. The mounting sleeve 100 has a channel 101 that receives a part of the band 66.

The upper filter portion 80 further includes a tubular portion 102 of the mounting sleeve 100 that is adapted to be located within and extend through a respective opening 46 in the tubesheet 44 and the band 66. A tube 104 is fixed to and extends from the mounting sleeve 100. The tube 104 is made from a suitable material, such as perforated sheet metal, expanded metal or mesh screen. A radially inner channel 103 in the mounting sleeve 100 receives an upper end of the tube 104. The upper end of the tube 104 and the mounting sleeve 100 sleeve are connected together in a suitable manner, such as by welds, rivets, fasteners or metal deformation. Thus, a relatively strong connection and structure exists that is capable of supporting the weight of the filter assembly 24 as it hangs from the tubesheet 44 even when the filter assembly has a relatively heavy accumulation of particles.

A pleated element 120 is located concentrically around the tube 104. The tube 104 supports the pleated element 120 in a radial direction. The pleated element 120 is formed in a substantially tubular shape about the perimeter of the tube 104 with accordion folds at its inner and outer peripheries. The pleated element 120 may be constructed of any suitable material for a desired filtering requirement. The upper end of the pleated element 120 is also located in the channel 103 of the mounting sleeve 100 and placed in a potting material 106, which acts to seal the pleated element and the mounting sleeve. It will be apparent that the pleated element 120 could be located radially inward of the tube 104.

A collar 140 is fixed to the tube 104 at the lowermost end (as viewed in FIGS. 2–3) of the upper filter portion 80. The collar 140 of the upper filter portion 80 defines an open end of the upper filter portion for fluid to flow through. The collar 140 is made from a suitable material, such as sheet metal. The tube 104 and collar 140 are connected together in a suitable manner, such as by welds, rivets, fasteners or metal deformation. Thus, a relatively strong connection is provided which is capable of supporting the weight of one or more filter portions that may be connected to the upper filter portion 80 even when those filter portions have a heavy accumulation of particulates.

Potting material 108 is located between the exterior of the lower end of the pleated element 120 and a support 110 of the collar 140 to form a seal. The collar 140 includes a tubular portion 142. A flange portion 144 is located at the lower end of the tubular portion 142 (as viewed in FIG. 3) and extends radially outward from the tubular portion. A lower end of the tube 104 is located between portions of the support 110 and the tubular portion 142 of the collar 140.

The lower filter portion 82 includes another collar 180 at its upper end (as viewed in FIG. 3). The collar 180 is preferably identical to the structure and size of the collar 140. The collar 180 defines an open end of the lower filter portion 82 through which fluid may flow to the upper filter portion 80. The collar 180 has tubular portion 182 and a radially extending flange portion 184. The collar 180 is made from a suitable material, such as sheet metal.

A tube 186 is fixed to and extends from the collar 180. The tube 186 is made from a suitable material, such as perforated sheet metal, expanded metal or mesh screen. The tube 186 and second collar 180 are connected together in a suitable manner, such as by welds, rivets, fasteners or metal deformation. Thus, a relatively strong structure is provided with sufficient strength capable of supporting the operational weight of the lower filter portion 82 even when particulates accumulate on the lower filter portion.

A pleated filter element 188 is disposed about and radially supported by the tube 186. A plate 190 is located at the lower end (as viewed in FIG. 3) of the lower filter portion 82 to define a closed end of the lower filter portion and the filter assembly 24. The plate 190 is preferably fixed to the tube 186. Potting material 192, 194 is located between the exterior of the pleated element 188 and a support 183 of the collar 180 and the plate 190, respectively, to form a seal.

While a circular cross-section lower filter portion 82 is described, it will be apparent that any shaped cross section may be used, such as oval or square and which matches the size and cross-section of the upper filter portion 80. It should also be apparent that the potting material 106, 108, 192 and 194 does not carry much, if any, of the load resulting from the operational weight of the filter assembly 24, when particulates accumulate on the filter assembly. Both filter portions 80, 82 have a maximum diameter D3 so they can fit through the opening 46 in the tubesheet 44 and band 66.

The filter assembly 24 also includes a connection device to sealingly connect the upper and lower filter portions 80, 82 together. The connection device has a maximum size that is smaller than the effective size D1 of the opening 46 in the tubesheet 44 and the band 66 when the connection device connects together the filter portions 80, 82. The size D4 of the connection device is preferably smaller than the size of the upper filter portion 80. The connection device, thus, can fit through the opening 46 in the tubesheet 44 and the band 66. The connection device also is constructed to have a strength sufficient to carry the load of the operational weight of at least one filter portion 82 located below the connection device.

One connection device of the present invention preferably comprises a clamp 200 (best seen in FIGS. 4 and 5) made from metal. The clamp 200 includes clamp portions 202, 204 which are movable in a plane extending substantially normal to a longitudinal central axis A of the filter assembly 24 between an unclamped position and a clamped position. Each of the clamp portions 202, 204 spans about 180° of the clamp 200, as viewed in FIG. 4.

Each of the clamp portions 202, 204 has a central portion 220 with generally U-shaped cross-section, as viewed in FIG. 5, with wings 222 extending from opposite sides of the central portion. The clamp 200 includes a hinge 206 and at a diametrally opposite side (as viewed in FIG. 4) is a pivotable lever 208 carrying a latch 210 at an end of clamp portion 204. On an end of the clamp portion 202 is a receiver 212. When the flanges 144, 184 are received in the central portion 220 of the clamp 200, the latch 210 is placed in the receiver 212. The lever 208 is then pivoted against the clamp portion 204 to sealingly connect the filter portions 80, 82 together.

A compressible split gasket 224 (FIG. 5) is located within the clamp portions 202, 204. The gasket 224 gets positioned between a surface of the clamp portions 202, 204 and at least one, but preferably both, of the collar 140 of the upper filter portion 80 and the collar 180 of the lower filter portion 82. The gasket 224 has a generally V-shaped groove in its middle portion 240 to receive the flanges 144, 184 of the collars 140, 180 and form a seal. As the filter portions 80, 82 are connected together, the clamp portions 202, 204 exert a radial force against the gasket 240 to engage and seal against the tubular portions 142, 182 and flange portions 144, 184 of the collars 140, 180. It will be apparent that the gasket 224 may have any suitable size, shape and configuration that meet the sealing and load carrying requirements of the filter assembly. The clamp 200 has a size D4 capable of fitting through the effective size D1 of the opening 46 in the tubesheet 44 and band 66.

A clamp 240 according to an alternate embodiment of the present invention is illustrated in FIG. 6 and performs the same functions as the clamp 200, illustrated in FIGS. 2–5 and described above. The clamp 240 has three sections 242 spot-welded to a band 244. The sections 242 are movable in a plane extending normal to the axis A of the filter assembly 24 between clamped and unclamped positions. The sections 242 of the clamp 240 move from an expanded state to a contracted state to connect and seal the filter portions 80, 82 together.

Ends of the band 244 are formed into a loop 246. The clamp 240 has a tightening mechanism 248 including a single threaded member 250. One end of the threaded member 250 is pivotably received in one loop 246. A support 252 receives the threaded member 250 and has a portion received in the other loop 246. A nut 254 of the clamp 240 is tightened against the support 252 to move the sections 242 towards the axis A and over the flange portions 144, 184 and against the tubular portions 142, 182 of the collars 140, 180. The clamp 240 has a size capable of fitting through the opening 46 in the tubesheet 44 and band 66.

A clamp 260 according to another alternate embodiment is illustrated in FIG. 7. The clamp 260 has a size capable of fitting through the effective size D1 of the opening 46 in the tubesheet 44 and band 66. The clamp 260 includes a pair of halves 262 that are identical and span about 180° of the clamp.

Each clamp half 262 includes a pair of connecting sections 264 on diametrally opposite ends. A threaded fastener 266 extends through an adjacent pair of connecting sections 264. A compressible circular gasket 270 with a U-shaped cross-section is located between the halves 262 of the clamp 260 and the flange portions 144, 184. When a nut 268 is tightened on the threaded fasteners 266 the clamp halves 262 move toward the axis A and the gasket 270 sealingly engages the flanges 144, 184 of the collars 140, 180. Another compressible gasket 272 may be located between the flange portions 144, 184 to provide additional sealing and to act as a cushion between the flange portions.

The filter assembly illustrated in FIGS. 9 and 10 includes an alternate connection device in the form of a threaded connection 300. The filter portions 80, 82 of the filter assembly 24 are constructed similar to the filter portions illustrated in FIGS. 1–3 and described above. The threaded connection 300 includes a collar 302 located at the lower end (as viewed in FIG. 10) of the upper filter portion 8. The collar 302 has a receiving internally threaded portion 304. The collar 302 is fixed to the tube 104 of the upper filter portion 80, as viewed in FIG. 10, in a suitable manner such as by welds, rivets, fasteners or metal deformation. The threaded connection 300 also includes a collar 320 located at the upper end of the lower filter portion 82. The collar 320 has an externally threaded tubular portion 322 for threaded engagement with the receiving portion 304. The collar 320 is fixed to the tube 184 of the lower filter portion 82, as viewed in FIG. 10, in a suitable manner such as by welds, rivets, fasteners or metal deformation.

A compressible gasket 340 is located between a lower end surface of the collar 302 of the upper filter portion 80 and an upper end surface of the collar 320 of the lower filter portion 82. The gasket 340 compresses as the filter portions 80, 82 are connected together when one filter portion 80 or 82 is rotated about the axis A relative to the other filter portion 82 or 80 to engage the threaded portions 304, 322 and thread the collar 320 into the collar 302. The connection device 300 has a size capable of fitting through the effective size D1 of the opening 46 in the tubesheet 44 and the band 66. The connection device 300 has a strength sufficient to support the operational weight of filter portions located below the connection device, as viewed in FIG. 10.

Figure 11:
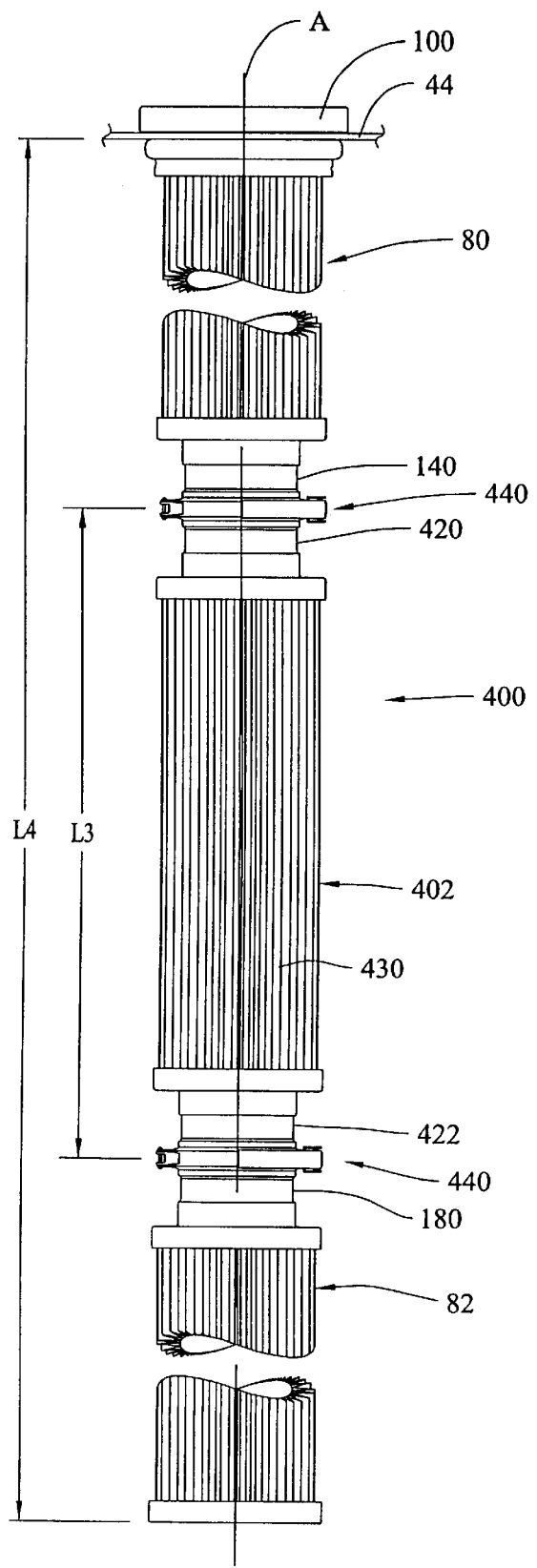
FIG. 11 is a view similar to FIG. 2 of a filter assembly having an additional filter portion according to another embodiment of the present invention.

A filter assembly 400 (FIG. 11) with a slightly different structure may optionally include a third filter portion 402 which has a length L3. The filter assembly 400 includes the upper filter portion 80, as illustrated in FIGS. 2–3 and described above. The filter assembly 400 also includes the lower filter portion 82, as illustrated in FIGS. 2–3 and described above. The third filter portion 402 is located between and connected to the upper filter portion 80 and the lower filter portion 82 to provide flexibility in establishing a length L4 of the filter assembly 400.

The third filter portion 402 has collars 420, 422 located at opposite ends which define open ends for fluid to flow through. The collars 420, 422 are identical to the collars 140, 180 illustrated in FIG. 3 and described above. A tube (not shown) in the filter portion 402 supports a pleated filter element 430 as described above for the filter portions 80, 82. The tube 402 is fixed at opposite ends to the collars 420, 422. The tube and collars 420, 422 are connected together in a suitable manner, such as by welds, rivets, fasteners or metal deformation. Thus, a relatively strong connection and structure exists that is capable of supporting the operational weight of filter portions located below (as viewed in FIG. 11) the filter portion 402.

A pair of connection devices 440 are located at the opposite ends of the third filter portion 402. Each connection device 440 sealingly connects a collar 140 or 180 of a respective filter portion 80 or 82 with a collar 420 or 422 of an axially adjacent filter portion 402 to permit fluid communication among the connected filter portions 80, 82, 402. Each connection device 440 may be of the structure and function of the connection devices 200, 240 or 260, illustrated in FIGS. 2–8 and described above.

Each of the connection devices 440 has a size capable of fitting through the effective size D1 of the opening 46 of the tubesheet 44 and the band 66. Each connection device 440 has a strength sufficient to support the operational weight of filter portions located below the connection device, as viewed in FIG. 11. It will be apparent that any number of third filter portions 402 may be used and located between the first and lower filter portions 80, 82 to provide a filter assembly 400 of the desired overall length L4. It will also be apparent that the filter assembly 400 may have connection devices with a structure of the threaded connection device 300, illustrated in FIG. 10 and described above.

To effect installation of the filter assembly 24 (FIGS. 1–3), a method of the present invention is followed. The method is directed to installing the relatively long filter assembly 24 in a new or existing baghouse 20. The method generally requires two people in the baghouse 20.

The method includes providing the upper filter portion 80 with the pleated element 120. The mounting sleeve 100 is located at one end and the collar 140 is located at the opposite end. Fluid may flow through both ends of the upper filter portion 80.

The method also includes providing the lower filter portion 82 with the pleated filter element 188. The collar 180 is located at a first open end through which fluid may flow. The plate 190 is located at a second end of the lower filter portion 82 to define a closed end of the lower filter portion and the filter assembly 24.

Preferably, both people are located in the clean air plenum 42 to connect together the filter portions 80, 82. The lower filter portion 82 is held by one person so it is at least partially in the clean air plenum 42 and at lest partially in the dirty air plenum 40. The upper filter portion 80 is supported by the other person so it is entirely in the clean air plenum 42. The filter portions 80, 82 are aligned along the axis A and the collar 140 and 180 are brought into axial engagement. This requires that the lower filter portion 82 is supported so it extends through the opening 46 in the tubesheet 44. A gasket may be placed between axially adjacent ends of the filter portions 80, 82. One person in the clean air chamber 42 then sealingly connects together the filter portions 80, 82.

the collar 140 (FIG. 3) of the upper filter portion 80 is connected together with the collar 180 of the lower filter portion 82 by a connection device 200, 240 or 260. The connection device 200, 240 or 260 has sufficient strength to support the weight of filter portions located below the connection device. The filter assembly 24 and connection device 200, 240 or 260 is then moved through the opening 46 in the tubesheet 44 and the band 66. It will also be apparent that the connection device could have the structure of the connection device 300, illustrated in FIG. 10 and described above. Use of the connection device 300 requires that one filter portion 80 or 82 is rotated in an advancing direction about the axis A relative to the other filter portion 82 or 80 when the threaded portion 322 of the collar 320 is in threaded engagement with the threaded portion 304 of the collar 302.

The connecting together step may further include the step of providing a filter assembly 24 having a length L greater than the height H2 of the clean air plenum 42 when the upper and lower filter portions 80, 82 are connected together. The mounting sleeve 100 of the upper filter portion 80 is then fixed to the tubesheet 44 of the baghouse 20 to support the filter assembly 24. It will be apparent that the filter portions 80, 82 could be connected together in the dirty air plenum 40 which would not require that the connection device have a size less than the size D1 of the opening 46 in the tubesheet 44 and band 66.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A filter assembly for use in a baghouse and adapted to hang in a substantially vertical direction, the baghouse being divided into first and second plenums by a substantially planar tubesheet portion with a plurality of openings, the first plenum having a first dimension taken normal to the planar portion of the tubesheet, the second plenum having a second dimension taken normal to the planar portion of the tubesheet and being greater than the first dimension, said filter assembly comprising:

a first filter portion including a first attachment at a first end adapted to mount to the tubesheet adjacent an opening through the tubesheet to support at least a portion of said first filter portion in the second plenum and to permit fluid communication between said first filter portion and the first plenum, a tubular member fixed to an extending from said first attachment, a pleated filter element disposed adjacent to said tubular member for support, and a second attachment fixed to said tubular member at a second end of said first filter portion, said second attachment defining an opening through which fluid may flow, said tubular member fixed to said first and second attachments with a strength sufficient to support the weight of at least one other filter portion;

a second filter portion including a third attachment at a first end and which said third attachment defines an opening through which fluid may flow, a tubular member fixed to and extending from said third attachment, a pleated filter element disposed adjacent to said tubular member for support, and a plate at a second end of said second filter portion to define a closed end of said second filter portion; and a clamping mechanism to sealingly connect said second attachment of said first filter portion with said third attachment of said second filter portion and permit fluid communication between said first and second filter portions, said clamping mechanism having a strength sufficient to support the weight of at least one filter portion located on the side of said clamping mechanism opposite the first attachment of said first filter portion.

2. The filter assembly of claim 1 wherein said filter assembly has a length greater than the first dimension of the first plenum.

3. The filter assembly of claim 1 wherein at least one of said first and second filter portions has a length in the range of one meter to three meters.

4. The filter assembly of claim 1 wherein said first filter portion further includes a portion adapted to extend through a respective opening in the tubesheet when said filter assembly is mounted to the tubesheet.

5. The filter assembly of claim 1 wherein said clamping mechanism includes portions movable in a plane extending substantially normal to a longitudinal central axis of said filter assembly from an unclamped position to a clamped position against flanges of said first and second filter portions.

6. The filter assembly of claim 1 further including a gasket locatable between a surface of said clamping mechanism and at lest a portion of one of said second attachment of said first filter portion and said third attachment of said second filter portion.

7. The filter assembly of claim 1 further including a third filter portion with attachments at opposite open ends fixed to a tubular member supporting a pleated filter element, said third filter portion adapted to be located intermediate and connected to said first and second filter portions by a pair of clamping mechanisms, each of said clamping mechanisms sealingly connect an attachment of one filter portion with an attachment of an axially adjacent filter portion to permit fluid communication between said connected filter portions, each of said clamping mechanisms having a strength sufficient to support the weight of filter portions located on the side of said clamping mechanism opposite said first attachment of said first filter portion.

8. The filter assembly of claim 1 wherein said tubular member is fixed to at least one of said attachments by welding, riveting, fastening or metal deformation.

9. The filter assembly of claim 1 wherein said clamping mechanism has a size capable of fitting through the opening in the tubesheet.

10. A filter assembly for use in a baghouse and adapted to hang in a substantially vertical direction, the baghouse being divided into first and second plenums by a substantially planar tubesheet having a plurality of openings, the first plenum having a first dimension taken normal to the tubesheet, the second plenum having a second dimension taken normal to the tubesheet and being greater than the first dimension, said filter assembly comprising:

a first filter portion open at opposite first and second ends in which said first end is adapted for fluid communication with the first plenum, said first filter portion including a tubular member, a pleated filter element disposed about said tubular member for support, and a first attachment at said second end of said first filter portion fixed to said tubular member, said tubular member is fixed to said first and second attachments with sufficient strength to support the weight of at least one other filter portion;

a second filter portion open at a first end, said second filter portion including a second attachment at the first end of said second filter portion, a tubular member extending from said second attachment, a pleated filter element disposed about said tubular member for support, and a plate at one end of said second filter portion to define a closed second end of said second filter portion; and a clamping mechanism to sealingly connect said first and second attachment portions together of said first and second filter portions and permit fluid communication between said first and second filter portions, said clamping mechanism capable of supporting the operational weight of said second filter portion.

11. The filter assembly of claim 10 in which said filter assembly has a length greater than the first dimension of the first plenum.

12. The filter assembly of claim 10 wherein said first filter portion further includes a portion adapted to extend through an opening in the tubesheet and a portion connectable with the tubesheet to support said filter assembly.

13. The filter assembly of claim 10 wherein said clamping mechanism includes portions movable in a plane extending substantially normal to a longitudinal central axis of said filter assembly from an unclamped position to a clamped position against flanges of said first and second filter portions.

14. The filter assembly of claim 13 further including a gasket fixed to a surface of said clamping mechanism and locatable between a of surface of said clamping mechanism and at least one of said first attachment of said first filter portion and said second attachment of said second filter portion.

15. A method of installing a relatively long filter assembly in a baghouse that is divided into first and second plenums by a substantially planar tubesheet having a plurality of openings, the first plenum having a first dimension taken normal to the tubesheet and the second plenum having a second dimension taken normal to the tubesheet greater than the first dimension, and at least one filter assembly is adapted to extend into the second plenum, said method comprising the steps of:

providing a first filter portion with a first attachment at a first end, a tubular member fixed to and extending from the first attachment, a pleated filter element disposed adjacent to the tubular member for support and a second attachment fixed to and extending from the tubular member at a second open end of the first filter portion through which fluid may flow;

providing a second filter portion with a third attachment at a first open end of the second filter portion through which fluid may flow, a tubular member fixed to and extending from the third attachment, a pleated filter element disposed adjacent to the tubular member for support and a plate at a second end of the second filter portion to define a closed end of the filter assembly; and connecting together the second attachment of the first filter portion with the third attachment of the second filter portion with a clamping mechanism having sufficient strength to support the operational weight of filter portions located on a side of the clamping mechanism opposite the first attachment of the first filter portion.

16. The method of claim 15, wherein said connecting together step is performed in the first plenum and further includes the step of moving the filter assembly and clamping mechanism through the opening in the tubesheet.

17. The method of claim 15 in which said connecting together step further includes the step of providing a filter assembly having a length greater than the first dimension of the first plenum when the first and second filter portions are connected together.

18. The method of claim 15 further including the step of fixing the first attachment of the first filter portion to the tubesheet of the baghouse to support the filter assembly.

19. The method of claim 15 wherein said connecting together step comprises moving portions of a clamp in a plane extending normal to a longitudinal central axis of the filter assembly to a clamped position against the second and third attachments.

20. A baghouse comprising:

a housing divided into first and second plenums by a substantially planar tubesheet having a plurality of openings therethrough, the first plenum having a first dimension taken normal to the tubesheet and the second plenum having a second dimension taken normal to the tubesheet and being greater than the first dimension; and a plurality of filter assemblies supported by the tubesheet to each hang in a substantially vertical direction, each of said plurality of said filter assemblies including:

a first filter portion including a first attachment for mounting to a tubesheet at a first end of said first filter portion, a tubular member fixed to and extending from said first attachment, a pleated filter element disposed about and supported by said tubular member, and a second attachment fixed to said tubular member at a second end of said filter portion and which defines an opening through which fluid may flow, said tubular member fixed to said first and second attachments with a strength sufficient to support the operational weight of at least one other filter portion;

a second filter portion including a third attachment at a first end and which defines an opening through which fluid may flow, a tubular member fixed to and extending from said third attachment, a pleated filter element disposed about and supported by said tubular member, and a plate at a second end of said second filter portion and which defines a closed end of said filter assembly; and a clamping mechanism to sealingly connect said second attachment of said first filter portion with said third attachment of said second filter portion to permit fluid communication between said first and second filter portions, said clamping mechanism having sufficient strength to support the weight of filter portions located on the side of said clamping mechanism opposite the first attachment of said first filter portion, at least one of said filter assemblies having a length greater than the first dimension of said first plenum when said first and second filter portions are connected together.

21. The baghouse of claim 20 wherein said first filter portion further includes a portion adapted to extend through an opening in the tubesheet.

22. The baghouse of claim 20 wherein said clamping mechanism includes portions movable in a plane extending substantially normal to a longitudinal central axis of said filter assembly from an unclamped position to a clamped position against flanges of said first and second filter portions.

23. The baghouse of claim 20 further including a gasket locatable between a surface of said clamping mechanism and at least a portion of one of said second attachment of said first filter portion and said third attachment of said second filter portion.

24. The baghouse of claim 20 wherein at least one of said filter assemblies further includes a third filter portion with attachments at opposite open ends, said third filter portion adapted to be located intermediate and connected to said first and second filter portions by a pair of clamping mechanisms, each of said clamping mechanisms sealingly connects an attachment of one filter portion with an attachment of an axially adjacent filter portion to permit fluid communication between said filter portions, each of said clamping mechanisms of a size capable of fitting through the opening in the tubesheet and having sufficient strength to support the weight of filter portions located on the side of said clamping mechanism opposite the first attachment of said first filter portion.

* * * * *